United States Patent [19]

Atsukawa et al.

[11] 4,038,368
[45] July 26, 1977

[54] PROCESS FOR REMOVING OXIDES OF NITROGEN AND SULFUR FROM EXHAUST GASES

[75] Inventors: Masumi Atsukawa; Naoharu Shinoda; Naohiko Ukawa, all of Hiroshima, Japan

[73] Assignee: Mitsubishi Jukogyo Kabushiki Kaisha, Tokyo, Japan

[21] Appl. No.: 579,051

[22] Filed: May 20, 1975

[30] Foreign Application Priority Data

June 3, 1974   Japan .................................. 49-61860

[51] Int. Cl.² ............................................ C01B 21/00
[52] U.S. Cl. .................................. 423/235; 423/242; 423/351
[58] Field of Search ............... 423/351, 235, 239, 398, 423/399, 395, 385, 242

[56]               References Cited
          U.S. PATENT DOCUMENTS

| | | | |
|---|---|---|---|
| 1,918,622 | 7/1933 | van der Melilen | 423/499 |
| 2,800,390 | 7/1957 | Behrman | 423/499 |
| 2,828,184 | 3/1958 | Behrman | 423/499 |
| 3,733,393 | 5/1973 | Couillaud et al. | 423/242 |
| 3,758,668 | 11/1973 | Lapple et al. | 423/242 |
| 3,904,742 | 9/1975 | Akimoto | 423/242 |

OTHER PUBLICATIONS

Chem. Abstracts-Vol. 37-No. 3999-4000-1943.

Primary Examiner—O. R. Vertiz
Assistant Examiner—Eugene T. Wheelock
Attorney, Agent, or Firm—Cushman, Darby & Cushman

[57]               ABSTRACT

A process for wet-treating an exhaust gas to remove oxides of sulfur and of nitrogen including:

1. washing the exhaust gas with a slurry containing one or more magnesium compounds to remove oxides of sulfur from the exhaust gas;

2. washing the exhaust gas treated in step (1) with an aqueous solution of an alkali metal iodide and/or an alkaline earth metal iodide to remove the oxide of nitrogen; and 3. contacting the slurry from step (1) with the aqueous solution from step (2) to regenerate the solution of alkali metal iodide and/or alkaline earth metal iodide and to decompose any nitrite formed in step (2) to nitrogen.

9 Claims, 1 Drawing Figure

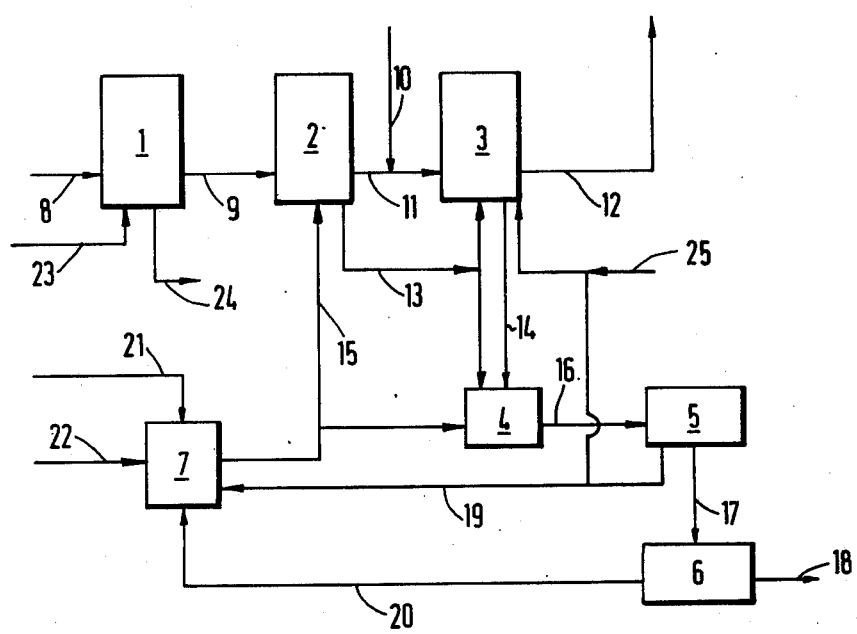

PROCESS FOR REMOVING OXIDES OF NITROGEN AND SULFUR FROM EXHAUST GASES

The present invention relates to a process for wet-treating an exhaust gas to remove any oxide of sulfur ($SO_x$) and any oxide of nitrogen ($NO_x$) from the exhaust gas.

It has been discovered that an aqueous solution of an alkali metal and/or alkaline earth metal iodide dissolves oxides of nitrogen ($NO_x$), particularly nitrogen dioxide ($NO_2$). Based on that discovery we have invented a process for treating an exhaust gas containing oxides of sulfur and of nitrogen, namely a process for removing $SO_x$ and $NO_x$ from an exhaust gas which comprises oxidizing an exhaust gas containing oxides of sulfur and of nitrogen and thereafter washing the exhaust gas with solution containing an alkali metal iodide and/or alkaline earth metal iodide, which process is disclosed in U.S. patent application 579,055, filed May 20, 1975 by Masumi Atsukawa, Naoyuki Takahashi, Naoharu Shinoda and Naohiko Ukawa.

According to the present invention there is provided a process for wet-treating an exhaust gas to remove an oxide of sulfur and an oxide of nitrogen from the exhaust gas, which process comprises the steps of:

1. washing the exhaust gas with a slurry containing one or more magnesium compounds which will react with oxides of sulfur, thereby removing the oxide of sulfur from the exhaust gas;
2. washing the exhaust gas from step (1) with an aqueous solution of an alkali metal iodide and/or an alkaline earth metal iodide to remove the oxide of nitrogen from the exhaust gas; and
3. contacting the slurry from step (1) with the aqueous solution from step (2) to regenerate the solution of alkali metal iodide and/or alkaline earth metal iodide and to decompose any nitrite formed in step (2) to nitrogen.

The reaction between nitrogen dioxide and the alkali metal iodide and/or the alkaline earth metal iodide proceeds more readily than the reaction between nitric oxide and the iodide. If the exhaust gas contains significant amounts of nitric oxide, preferably, the exhaust gas is subjected to an oxidation reaction between steps (1) and (2) of the process.

The product of step (3) is a slurry comprising an alkali metal iodide and/or an alkaline earth metal iodide, magnesium sulfite, magnesium bisulfite and magnesium sulfate, etc. In a preferred form of the invention this slurry is separated and the filtrate, containing the alkali metal iodide and/or alkaline earth metal iodide is re-used in step (2). Magnesium sulfate is removed from the separated solids and the remaining solids can be used in the formation of the slurry for step (1).

The first step of the process of the present invention is a step of washing the exhaust gas with a slurry containing one or more magnesium compounds, for example a magnesium hydroxide or magnesium carbonate slurry, to absorb and remove oxides of sulfur in the exhaust gas. Preferably the absorption is undertaken in two stages, to improve absorption of the oxides of sulfur. The slurry is supplied to the second stage and the exhaust gas is contacted with the slurry in countercurrent flow. The slurry from this second stage which has absorbed oxides of sulfur is then supplied to the first stage and contacted with new exhaust gas. When the magnesium compound in the slurry is magnesium hydroxide, for example, the reaction may be shown as follows.

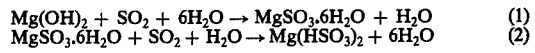

$$Mg(OH)_2 + SO_2 + 6H_2O \rightarrow MgSO_3 \cdot 6H_2O + H_2O \quad (1)$$
$$MgSO_3 \cdot 6H_2O + SO_2 + H_2O \rightarrow Mg(HSO_3)_2 + 6H_2O \quad (2)$$

In the first stage, where the exhaust gas contacts an absorbent slurry containing magnesium sulfite hexahydrate, part of the sulfur dioxide present is absorbed and removed in accordance with reaction (2). In the second stage, sulfur dioxide is further absorbed and removed by magnesium hydroxide in accordance with reaction (1). The magnesium hydroxide slurry absorbing sulfur dioxide in the second stage partly forms magnesium sulfite hexahydrate and is supplied to the first stage, as mentioned above.

By so treating the exhaust gas, more than about 90% of sulfur dioxide in the exhaust gas may be absorbed and removed.

The exhaust gas, freed of oxides of sulfur in this first step, is washed and treated in the second step with an aqueous solution containing an alkali metal iodide and/or alkaline earth metal iodide to absorb and remove the oxides of nitrogen in the exhaust gas. Nitrogen dioxide is more readily absorbed in the aqueous solution than nitric oxide. In the case where the greater part of the oxides of nitrogen present in the exhaust gas is nitrogen dioxide, the exhaust gas cam pass directly from step (1) to step (2). However, in the case where the greater part of the oxides of nitrogen present in the exhaust gas is nitric oxide, the exhaust gas should be treated with an oxidizing agent to oxidize nitric oxide to nitrogen dioxide.

$$NO + [O] \rightarrow NO_2 \quad (3)$$

Example of a suitable oxidizing agent are ozone, hydrogen peroxide and nitric acid, of which ozone is preferred.

The exhaust gas, in which the greater part of the oxides of nitrogen are present as nitrogen dioxide, is washed with an aqueous solution containing an alkali metal iodide and/or alkaline earth metal iodide. As will be apparent from the following reaction equation showing the case in which potassium iodide is used, nitrogen dioxide, for example, in the exhaust gas is fixed as a nitrite ($KNO_2$) and iodine is isolated in a solution. In general, iodine hardly dissolves in water; but it dissolves pretty well in an aqueous potassium iodide solution. Consequently hardly any iodine is entrained with the released gas.

$$2NO_2 + 2KI \rightarrow 2KNO_2 + I_2 \quad (4)$$

The exhaust gas treated in these first and second steps is freed of the most of any oxides of sulfur and oxides of nitrogen initially present and can be released to the atmosphere.

In the third step, the treated slurry from the first step is contacted and mixed with a treated absorbing liquid from the second step for the purpose of decomposing the nitrite formed in the second step to nitrogen, and at the same time regenerating iodine to an alkali metal iodide and/or alkaline earth metal iodide.

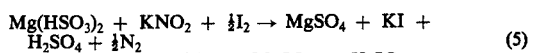
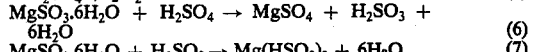
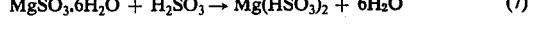

$$Mg(HSO_3)_2 + KNO_2 + \tfrac{1}{2}I_2 \rightarrow MgSO_4 + KI + H_2SO_4 + \tfrac{1}{2}N_2 \quad (5)$$
$$MgSO_3 \cdot 6H_2O + H_2SO_4 \rightarrow MgSO_4 + H_2SO_3 + 6H_2O \quad (6)$$
$$MgSO_3 \cdot 6H_2O + H_2SO_3 \rightarrow Mg(HSO_3)_2 + 6H_2O \quad (7)$$

Magnesium bisulfite in the treated slurry from the first step reacts with a nitrite ($KNO_2$) and free iodine in the treated absorbing liquid of the second step in accordance with the reaction (5); the nitrite is decomposed to nitrogen; the free iodine is regenerated as an alkali metal iodide and/or alkaline earth metal iodide; and at the same time, sulfuric acid is produced. The sulfuric acid and magnesium sulfite hexahydrate in the treated slurry of the first step are converted magnesium sulfate and sulfurous acid in accordance with the reaction (6), and the sulfurous acid further reacts with magnesium sulfite hexahydrate in accordance with the reaction (7) to form magnesium bisulfite.

The overall reaction scheme of the above equations is as follows.

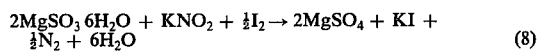

$$2MgSO_3\,6H_2O + KNO_2 + \tfrac{1}{2}I_2 \rightarrow 2MgSO_4 + KI + \tfrac{1}{2}N_2 + 6H_2O \quad (8)$$

The reaction is observed in detail, it is considered to proceed in accordance with the equations (5), (6) and (7). However, as shown in the equation (8), magnesium sulfite hexahydrate, potassium nitrite and free iodine react to produce magnesium sulfate, nitrogen and an alkali metal iodide and/or alkaline earth metal iodide.

This regeneration reaction of the third step, namely, the reactions considered in the equations (5), (6) and (7) or (8) proceeds relatively simply. It is possible to carry out the third step of the process separately from steps (1) and (2). However, if the treated slurry from the first step, especially from the first stage of the first step (namely, if the slurry containing magnesium sulfite is supplied to the second step) the third step can be carried out in the course of the second step and reaction (5), (6), (7) or (8) are easily carried out. When the third step, the regeneration step, is carried out in this way, iodine isolated from the treated absorbing liquid in the second step contacts the treated slurry from the first step and therefore the free iodine is removed by the reactions (5), (6) (7) or (8). The concentration of iodine in the treated absorbing liquid in the second step does not increase, so that entrainment of iodine into the exhaust gas exhausted via the second step is substantially reduced or prevented. However, with a view to reducing the degree of oxidation of magnesium sulfite hexahydrate to magnesium sulfate in the treated slurry of the first step, the amount the treated slurry resulting from the first step to be supplied to the second step should be only that amount containing magnesium sulfite hexahydrate corresponding to the iodine produced in the reaction (5).

In one embodiment, the process of the invention includes a fourth step for treating the slurry obtained in the third step, thereby collecting the effective components and circulating and re-using the collected effective components. The main components of the slurry obtained in the third step are an alkali metal iodide and/or alkaline earth metal iodide, magnesium sulfite, magnesium bisulfite and magnesium sulfate, of which magnesium sulfite is low in solubility, being present as crystals of a hexahydrate, namely, $MgSO_3.6H_2O$. It is possible to convert magnesium bisulfite to magnesium sulfite hexahydrate by the following reaction.

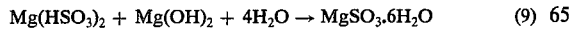

$$Mg(HSO_3)_2 + Mg(OH)_2 + 4H_2O \rightarrow MgSO_3.6H_2O \quad (9)$$

Accordingly, if the slurry from the third step is reacted with magnesium hydroxide, it is possible to divide the product of this reaction into a liquid phase containing an alkali metal iodide and/or alkaline earth metal iodide and magnesium sulfate and a solid phase consisting mainly of magnesium sulfite hexahydrate, which forms relatively large crystals which are easily separated. If the magnesium sulfite hexahydrate is roasted at 600° C in a rotary kiln or the like, it is decomposed to magnesium oxide and concentrated sulfur dioxide. It is possible to use the concentrated sulfur dioxide for preparing sulfuric acid and to re-use the magnesium oxide for preparation of the slurry for the first step of the process of this invention. If coke powder is added to the roasting to create a reducing atmosphere, the roasting is all the more effective.

Magnesium sulfate, as well as an alkali metal iodide and/or alkaline earth metal iodide, the solution obtained after separation of the magnesium sulfite hexahydrate. A greater part of the solution may be circulated and used in the second step and another smaller part of the solution may be used as water for preparing the slurry to be supplied to the first step. However, because magnesium sulfate will gradually accumulate in the system over a period, it is preferred to separate it as the salt $MgSO_4.7H_2O$.

The invention will be further illustrated with reference to the accompanying drawing which is a flow sheet of one embodiment of the process of the present invention.

An exhaust gas containing an oxide of sulfur and an oxide of nitrogen from a combustion apparatus (not shown) is first supplied via a line 8 to a humidifying and cooling apparatus 1, where the exhaust gas is humidified and cooled by water supplied from a line 23 and dust is removed via a line 24.

The exhaust gas from the humidifying and cooling apparatus 1 is supplied to an absorbing and washing apparatus 2 via a line 9. To this absorbing and washing apparatus 2, a slurry containing one or more magnesium compounds (a $Mg(OH)_2$ or $MgCO_3$ slurry) is supplied from a line 15 as an absorbing slurry, by which the oxides of sulfur in the exhaust gas are absorbed and removed.

The exhaust gas is freed of oxides of sulfur in the absorbing and washing apparatus 2 and then forwarded via a line 11 to an absorbing and washing apparatus 3. However, it is preferred to oxidize any nitric oxide present in the exhaust gas to nitrogen dioxide by an oxidizing agent such as ozone and nitric acid, supplied via a line 10, before the exhaust gas enters the absorbing and washing apparatus 3. To the absorbing and washing apparatus 3 an alkali metal and/or alkaline earth metal iodide is supplied via a line 19 (via connection with line 25), and absorbs and removes nitrogen dioxide in the exhaust gas. At this time, it is recommended to supply a part of the treated slurry extracted from the absorbing and washing apparatus 2 via a line 13 to the absorbing and washing apparatus 3 so that the aforementioned regeneration reaction takes place in the apparatus 3. The exhaust gas which has completed its treatment in the apparatus 3, i.e., the second step of the process of the invention, is released to the atmosphere via a line 12.

The treated absorbing liquid from the absorbing and washing apparatus 3 of the second step is supplied via a line 14 to a pH control vessel. A part of the treated slurry extracted from the absorbing and washing apparatus 2 of the first step is supplied via a line 13 to the pH control vessel 4 and the pH is adjusted to about 6 by a magnesium hydroxide slurry supplied at the same time via a line 15. By this control of the pH, a slurry whose magnesium bisulfite is converted to magnesium sulfite hexahydrate is forwarded via a line 16 to a separator 5 to separate solid from liquid. From here magnesium sulfite hexahydrate is forwarded via a line 17 to a roasting apparatus 6, where it is roasted at 600° C and decomposed to magnesium oxide and concentrated sulfur dioxide. The concentrated sulfur dioxide is removed via line 18 and used, for example, for preparing sulfuric acid. The magnesium oxide is forwarded via a line 20 to a vessel 7 for preparing the slurry. Part of the filtrate from separator 5 is forwarded to the absorbing and washing apparatus 3 via a line 19 via connection with line 25) while another part of the filtrate is forwarded to the vessel 7 for preparing the slurry for use in step (2) of the process.

In the vessel 7 the slurry is prepared from the solution from the line 19, magnesium oxide from the line 20 and supply water and magnesium oxide supplied from lines 21 and 22; and the prepared slurry is supplied to the absorbing and washing apparatus 2 as mentioned above via the line 15.

Supply of the alkali metal and/or alkaline earth metal iodide to replace losses is carried out by, for example, a line 25.

The invention is further illustrated by the following Examples.

EXAMPLE 1

An exhaust gas containing 0.1% by volume of sulfur dioxide at 200 Nm$^3$/h was to be treated. As an absorbing and washing apparatus of the first step, two 0.2 m $\phi$, 1 m high grid packed columns were used in succession. As an absorbing liquid, 5% by weight of magnesium hydroxide slurry was used, which was supplied to the second stage of the absorbing and washing apparatus, i.e., the second column, so that the pH of an absorbing liquid of the column stage was 4 – 6.5. In order that the liquid level of the second stage of the absorbing and washing apparatus would be constant, a part of the treated slurry from the second stage was extracted and transferred to the first stage of the absorbing and washing apparatus i.e., the first column, and the absorbing liquid and treated slurry were contacted with the exhaust gas, respectively. From the first stage of the absorbing and washing apparatus also, the treated slurry was extracted so that the liquid level would be constant.

When the sulfur dioxide absorption rate and the slurry concentration were measured at a time when a stationary state had been achieved, the following results were obtained.

The first stage of the absorbing and washing apparatus:

| | |
|---|---|
| SO$_2$ concentration in the gas at the exit: | 700 ppm |
| Composition of components in the extracted treated slurry: | |
| Mg(OH)$_2$ | 0 |
| Mg(HSO$_3$)$_2$ | 1.5% by weight |
| MgSO$_3$ | 8.0% by weight |
| pH of the treated slurry: | 4 |

The second stage of the absorbing and washing apparatus:

| | |
|---|---|
| SO$_2$ concentration in the gas at the exit: | 50 ppm |
| Composition of components in the extracted treated slurry: | |
| Mg(OH)$_2$ | 0.5% by weight |
| Mg(HSO$_3$)$_2$ | 0 |
| MgSO$_3$ | 7.9% by weight |
| pH of the treated absorbing liquid | 6.2 |

Next, 1N liter/min of an exhaust gas consisting of 160 ppm of NO$_2$, 4% of O$_2$ and the balance of N$_2$ was to be treated. 200cc of 7% aqueous solution of KI were charged in a Muenke's gas washing bottle, to which the aforesaid gas was passed and an NO$_2$ absorption test (absorbing time 30 minutes and solution temperature of the absorbing liquid 55° C) corresponding to the second step was carried out.

The results were as follows.

| | |
|---|---|
| NO$_2$ concentration in the gas taken out after 30 minutes: | 5.5 ppm |
| Composition of the treated absorbing liquid: | |
| KI | 500 mmol/liter |
| KNO$_2$ | 1.25 mmol/liter |
| I$_2$ | 0.62 mmol/liter |

Next, 100 ml of a slurry having about the same composition as the treated slurry extracted from the first stage of the first step, namely a slurry containing 0.05 mol/liter of MgSO$_3$.6H$_2$O and 100 ml of a solution having about the same composition as the treated absorbing liquid extracted from the second step, namely, an aqueous solution containing 0.74 mmol/liter of I$_2$ and 1.52 mmol/liter of KNO$_2$ were charged in a Muenke's gas washing bottle, to which nitrogen gas was passed and the contents of the bottle were reacted with stirring of the gas and a regenerating step corresponding to the third step was tested. In order that the pH of a first mixed liquid would be 4.0, sulfuric acid was added to control the pH. The results were as follows.

| | |
|---|---|
| Temperature of the liquid | 55° C |
| Reaction time | 5 minutes |
| Composition of main liquids in the reaction treated liquid: | |
| I$_2$ | 0 |
| KNO$_2$ | 0.11 mmol/liter |
| NO$_x$ concentration in the N$_2$ gas at the exit: | Neither NO nor NO$_2$ could be detected. |

EXAMPLE 2

In the second step of Example 1, instead of using a 7% aqueous solution of KI, a 15% aqueous solution of CaI$_2$ was used. The results were as follows.

| | |
|---|---|
| Absorption time: | 30 minutes |
| NO$_2$ concentration in the gas taken out after 30 minutes: | 6.3 ppm |
| Composition of the treated absorbing liquid: | |
| CaI$_2$ | 498 mmol/liter |
| Ca(NO$_2$)$_2$ | 1.3 mmol/liter |
| I$_2$ | 0.60 mmol/liter |

What is claimed is:
1. A process for wet-treating an exhaust gas to remove an oxide or sulfur and nitrogen dioxide from the exhaust gas, which process comprises the steps of:
   1. washing the exhaust gas with a slurry containing one or more magnesium compounds which will react with oxides of sulfur, thereby removing the oxide of sulfur from the exhaust gas;

2. washing the exhaust gas treated in step (1) with an aqueous solution of an alkali metal iodide, an alkaline earth metal iodide or mixtures thereof to remove the oxide of nitrogen from the exhaust gas; and 3. contacting the slurry from step (1) with the aqueous solution from step (2) to regenerate the solution of alkali metal iodide, alkaline earth metal iodide or mixtures thereof and to decompose any nitrite formed in step (2) to nitrogen.

2. A process according to claim 1 wherein the exhaust gas from step (1) is treated with an oxidizing agent to convert any nitric oxide to nitrogen dioxide before being subjected to step (2).

3. A process according to claim 2 wherein the oxidizing agent is ozone, hydrogen peroxide, or nitric acid.

4. A process according to claim 1 wherein step (1) is carried out in two stages, the exhaust gas passing through a first stage and then through a second stage while the slurry is supplied first to the second stage and then to the first stage of step (1).

5. A process according to claim 1 wherein the slurry from step (3) is separated into a solid phase and a liquid phase containing alkali metal iodide, alkaline earth metal iodide or mixtures thereof and the liquid phase is recycled into step (2).

6. A process according to claim 5 wherein the slurry from the third step is reacted with magnesium hydroxide to convert magnesium bisulfite to magnesium sulfite hexahydrate prior to the separation.

7. A process according to claim 6 wherein the separated magnesium sulfite hexahydrate is roasted to convert it to magnesium oxide which upon admixture with water forms the slurry for step (1) and is recycled into step (1).

8. A process for wet-treating an exhaust gas to remove an oxide of sulfur and an oxide of nitrogen from the exhaust gas, which process comprises the steps of:
washing the exhaust gas with a mixture of (a) a slurry containing one or more magnesium compounds which will react with oxides of sulfur, (b) an aqueous solution of an aqueous solution of an alkali metal iodide, an alkaline earth metal iodide or mixtures thereof to remove the oxide of nitrogen from the exhaust gas, and to decompose any nitrite to nitrogen.

9. A process according to claim 1 which includes the additional step of admixing the slurry from step (1) with the aqueous solution used in step (2) so that step (3) of the process is carried out with step (2).

* * * * *